United States Patent
Spinks et al.

(10) Patent No.: US 10,140,140 B2
(45) Date of Patent: Nov. 27, 2018

(54) CLOUD VIRTUAL MACHINE CUSTOMIZATION USING EXTENSION FRAMEWORK

(71) Applicant: MICROSOFT TECHNOLOGY LICENSING, LLC, Redmond, WA (US)

(72) Inventors: Aaron Edward Spinks, Redmond, WA (US); Wakkas Rafiq, Snoqualmie, WA (US); Sarat Rallapalli, Bellevue, WA (US); Ahmed Hassan Elsayed El Baz, Redmond, WA (US); Kundana Palagiri, Redmond, WA (US); Zhidong Peng, Redmond, WA (US); Marc V. Greisen, Seattle, WA (US); Kai Han, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 17 days.

(21) Appl. No.: 14/788,121

(22) Filed: Jun. 30, 2015

(65) Prior Publication Data
US 2017/0003994 A1    Jan. 5, 2017

(51) Int. Cl.
G06F 9/455 (2018.01)
G06F 8/61 (2018.01)

(52) U.S. Cl.
CPC ............ *G06F 9/45558* (2013.01); *G06F 8/61* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS 7,657,887 B2 * 2/2010 Kothandaraman ..... H04L 67/06
  717/170
7,827,547 B1 * 11/2010 Sutherland ................ G06F 9/54
  717/121

(Continued)

OTHER PUBLICATIONS

Palagiri, Kundana, "VM Agent and Extensions—Part 1", Published on: Apr. 11, 2014 Available at: http://azure.microsoft.com/blog/2014/04/11/vm-agent-and-extensions-part-1.

(Continued)

*Primary Examiner* — Wynuel Aquino
(74) *Attorney, Agent, or Firm* — Shook, Hardy & Bacon L.L.P.

(57) ABSTRACT

In various embodiments, methods and systems for remotely customizing a virtual machine in a cloud computing infrastructure are provided. A VM agent component provided on a virtual machine, while in communication with a VM deployment service associated therewith, can be configured to detect an incoming configuration payload that corresponds to a selected one or more extension packages cataloged on a VM marketplace component in communication with the VM deployment service component. Employing the configuration payload, the VM agent component can initialize communication with the extension repository to retrieve the one or more extension packages for storage and installation onto the virtual machine. Upon installing the one or more extension packages, the VM agent component can be configured to communicate a status report to the VM deployment service component for provision to an administrator.

12 Claims, 5 Drawing Sheets

(56) References Cited

U.S. PATENT DOCUMENTS

| | | | |
|---|---|---|---|
| 8,151,277 B2 | 4/2012 | Greifeneder et al. | |
| 8,225,317 B1 | 7/2012 | Chiueh et al. | |
| 8,595,361 B2 | 11/2013 | Chaturvedi et al. | |
| 8,677,351 B2 | 3/2014 | Le et al. | |
| 8,910,155 B1 | 12/2014 | Sobel et al. | |
| 8,938,782 B2 | 1/2015 | Sawhney et al. | |
| 2003/0154115 A1* | 8/2003 | Lahey | G06Q 10/10 718/106 |
| 2009/0241109 A1 | 9/2009 | Vandegrift et al. | |
| 2013/0167147 A1* | 6/2013 | Corrie | G06F 9/45533 718/1 |
| 2013/0185715 A1* | 7/2013 | Dunning | H04L 41/0803 718/1 |
| 2013/0232480 A1* | 9/2013 | Winterfeldt | G06F 8/60 717/177 |
| 2013/0263088 A1 | 10/2013 | Hoff et al. | |
| 2014/0164598 A1 | 6/2014 | Srinivasan et al. | |
| 2015/0020077 A1* | 1/2015 | Mantere, III | H04L 63/104 718/104 |

OTHER PUBLICATIONS

Palagiri, Kundana, "VM Agent and Extensions—Part 2", Published on: Apr. 15, 2014 Available at: http://azure.microsoft.com/blog/2014/04/15/vm-agent-and-extensions-part-2/.

Lamendola, et al., "Creating an Agent-Based Backup System for IBMPureApplication System", In Technical Article, Oct. 22, 2014, 26 pages.

Chiueh, et al., "Stealthy Deployment and Execution of In-Guest Kernel Agents", In Proceedings of the Black Hat USA Security Conference, Jul. 25, 2009, 12 pages.

Dinesh, "[Guide] How to Download and Install Latest Oracle VM VirtualBox Extension Pack 4.3.14 in Windows Host", Published on: Jul. 22, 2014 Available at: http://www.sysprobs.com/guide-download-install-oracle-vm-virtualbox-extension-pack-windows-host.

* cited by examiner

CLOUD VIRTUAL MACHINE CUSTOMIZATION USING EXTENSION FRAMEWORK

BACKGROUND

Virtual machines are typically managed by administrators who can access the virtual machines remotely, for instance, via remote access over a network. Virtual machine management, however, can be difficult due to the limitations of remote access. For instance, provisioning a new virtual machine may require, among other methods, remotely accessing the virtual machine host and initializing a customized installation script that must be frequently updated to comply with current security updates, software updates, and the like. If a virtual machine is provided to the administrator in a barebones state (i.e., having no particular configurations or software installed), the administrator must remotely access the virtual machine and manually install the software. In some cases, remote access to virtual machines can be restricted due to blocked ports or problems with remote desktop applications. Such restrictions may necessitate accessing, in person, the host machine on which the virtual machine is provisioned and manually installing the software.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein are directed to remotely customizing virtual machines by employing an extension framework. In particular, virtual machines ("VMs") can be remotely customized by employing an extension framework that packages applications into extension packages designed around a common extension protocol. The extension packages are published on a marketplace that provides VM administrators with a catalog of applications available for download and installation to one or more remotely managed virtual machines. To facilitate installation of the extension packages to a virtual machine, the virtual machine includes a VM agent component that is operable to, among other things, retrieve, install, configure, and communicate with the extension packages on the virtual machine. The VM agent can be remotely managed by a VM deployment service component that is managed by an administrator. The administrator can provide instructions to the VM deployment service to select one or more extension packages from the marketplace and remotely push the selected one or more extension packages to the VM agent for automated installation thereto. As the VM agents are configured to independently be in communication with the VM deployment service, the extension packages can be installed remotely on one or more virtual machines without concern of firewall port configurations or potential issues with remote desktop access.

In some embodiments described herein, a virtual machine configuration can be copied from one virtual machine to provision another virtual machine by employing the extension framework. In particular, a remote virtual machine including a remote VM agent component can be queried to provide a configuration payload referencing all extension packages installed on the remote virtual machine. A local virtual machine, employing a local VM agent component, can retrieve the extension packages in accordance with the configuration payload retrieved from the remote VM agent. The local VM agent can further install the extension packages on the local virtual machine to provision the local machine and replicate the extension packages installed on the remote virtual machine.

BRIEF DESCRIPTION OF THE DRAWINGS

The embodiments described herein are described in detail below with reference to the attached drawing figures, wherein.

DETAILED DESCRIPTION

Figure 1:
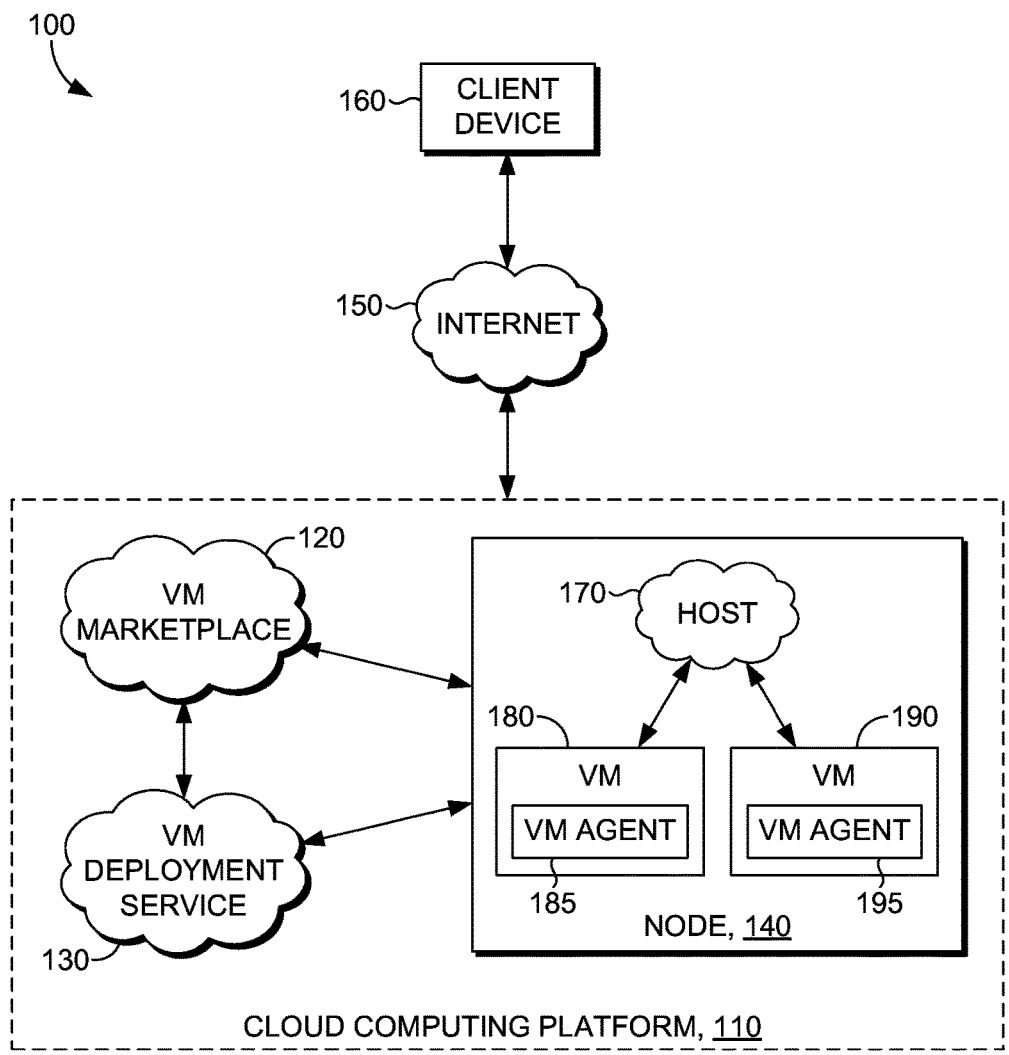
FIG. 1 is a block diagram of an exemplary operating environment in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b) unless otherwise indicated to the contrary.

A cloud computing platform provides system administrators with the ability to host virtual machines (VMs) on the cloud. Cloud-based VMs provide various benefits to administrators, including the ability to quickly deploy and manage services and applications without concerns typically associated with maintaining hardware and software locally. Provided the relatively low costs associated with configuring and managing virtual machines to host services and applications, administrators have started relying on cloud computing platforms over locally hosting their services and applications. However, relying on remotely-located computing platforms can present some disadvantages. For instance, if a VM host machine malfunctioned or required a hardreset, such maintenance of the host machine would require the physical presence of the administrator. In another instance, if firewall ports were closed or other means necessary for remotely accessing a virtual machine were malfunctioning, the administrator would need to be physically present to make changes to the virtual machine or host machine to open firewall ports or to troubleshoot the remote access application. Finally, as security is always a concern when hosting applications or services at a remote location, it is contemplated that if an administrator wants to migrate a remote virtual machine to a local virtual machine, processes for doing may also require the physical presence of the administrator.

Embodiments described herein are described with reference to the management of virtual machines supported by a cloud computing platform. The cloud computing platform generally includes a virtual machine marketplace (also referred to herein as "VM marketplace component"), configured to provide administrators with an "app store" experience, whereby administrators of cloud-based virtual machines can browse a centrally cataloged collection of VM applications (also referred to herein as "extension packages") designed around a common extension protocol and subsequently select one or more VM applications for automated installation into a particular virtual machine. As will be described, communications between a VM agent installed on a virtual machine and a remotely accessible management interface (also referred to herein as "VM deployment service") can facilitate the automated installation while minimizing the necessity for on-site deployment or management.

Various components described herein can be configured for performing novel aspects of different embodiments, where "configured for" comprises programmed to perform particular tasks or implement particular abstract data types using code. It is contemplated that methods described herein can be performed in different types of operating environments have alternative configurations of the functional components described herein. As such, the embodiments described herein are merely exemplary, and it is contemplated that the techniques described may be extended to other implementation contexts.

Embodiments described herein can be implemented on a cloud computing infrastructure that runs cloud applications and services across different data centers and geographic regions. The cloud computing infrastructure can implement a fabric controller component for provisioning and managing resource allocation, deployment/upgrade, and management of cloud applications and services. Typically, a cloud computing system acts to store data or run applications and services in a distributed manner. The application and service components of the cloud computing infrastructure may include nodes (e.g., computing devices, processing units, or blades in a server rack) that are allocated to run one or more portions of applications and services.

When multiple applications and services are being supported by the nodes, the nodes may be partitioned into virtual machines or physical machines that concurrently run the separate service applications, respectively, in individualized computing environments that support the resources and/or operating system specific to each service application. Further, each application or service may be divided into functional portions such that each functional portion is able to run on a separate virtual machine. In cloud computing infrastructures, multiple servers may be used to run the applications and services to perform data storage operations in a cluster. In particular, the servers may perform data operations independently but exposed as a single device referred to as a cluster. Each server in the cluster may be referred to as a node. Applications and services are used interchangeably herein.

A cloud computing infrastructure can support different types of services, such as, computing, storage, content delivery, networking, and security. When a service is being supported by a cloud computing infrastructure or cloud, the service includes a collection of virtual or native machines managed in combination with each other. Each machine can be assigned a private Direct IP (DIP) address, while the service is assigned one public Virtual IP (VIP) address. Traffic crossing the service boundary, e.g., to the Internet or to back-end services within the same data center such as storage, uses the VIP address. A service exposes zero or more external endpoints that each receives inbound traffic. It is contemplated that inbound traffic can be received using a specific network protocol and port on the VIP.

Embodiments are directed to customizing remote virtual machines by employing a resident VM agent component on a virtual machine operable to receive configuration payloads associated with administrator-selected extension packages. In more detail, a virtual machine administrator can review a published catalog of extension packages, each extension package compliant to a standard configuration for, among other things, standard installation to a virtual machine by a VM agent. Upon selecting one or more extension packages for installation to a particular virtual machine, the administrator can initiate an injection of the extension packages to the particular virtual machine. A VM deployment service associated with the administrator and in communication with one or more managed virtual machines can communicate a configuration payload to the particular virtual machine. The configuration payload references the one or more extension packages selected for installation to the particular virtual machine. When the VM agent on the particular virtual machine receives the configuration payload, the VM agent can initiate communication with an extension repository to download the one or more selected extension packages and install them to the particular virtual machine unattended.

Other embodiments can employ the resident VM agent component on two or more virtual machines to interexchange configuration payloads there between and provision one virtual machine to replicate a configuration of the other virtual machine. For instance, if an administrator initially provisioned a cloud-based virtual machine to host a service or application and later decided to host the service or application in a local virtual machine on a local network, the administrator could employ the extension framework to facilitate the replication of the remote VM configuration to the local virtual machine. In more detail, an administrator can query the remote VM agent component to provide a configuration payload to the local VM agent component. In accordance with the configuration payload, the local VM agent component can be employed to retrieve and install the same extension packages that are currently installed on the remote virtual machine, thereby provisioning the local virtual machine while replicating the extension packages that are installed on the remote virtual machine.

Accordingly, in a first embodiment described herein, a system that performs a method for remotely customizing virtual machines is provided. The system includes a processor and memory with computer-executable instructions embodied thereon that, when executed by the processor, performs the method. The system includes a VM marketplace component accessible by the administrator, a VM deployment service component associated with the administrator, and a VM agent component also associated with the administrator. The VM marketplace component is a catalog of published applications or "extension packages" that are configured for installation to one or more virtual machines. The VM marketplace component is further configured for receiving a selection of one or more extension packages from an administrator, for installing the selected one or more extension packages to a particular virtual machine. The VM deployment service component is configured for communicating one or more configuration payloads to the particular VM. The configuration payloads can each reference the selected one or more extension packages. The VM agent component is provided on the particular virtual machine and is configured for receiving the one or more configuration payloads and further initiating communication with an extension repository to download and install the selected one or more extension packages. The VM agent can also receive status reports from each extension package and communicate the status report to the VM deployment service for relay back to the administrator.

In a second embodiment described herein, one or more computer storage media having computer-executable instructions embodied thereon that, when executed, by one or more processors, causes the one or more processors to perform a method for remotely customizing virtual machines. The method includes detecting an incoming configuration payload on a VM agent component provided on a virtual machine. The incoming configuration payload is detected on the VM agent component while in communication with a VM deployment service component associated with the virtual machine. The incoming configuration payload corresponds to a selected one or more extension packages cataloged on a VM marketplace component in communication with the VM deployment service component. The method also includes initializing communication between the VM agent component and an extension repository configured to store a plurality of extension packages, retrieving the one or more extension packages from the extension repository in accordance with the incoming configuration payload, installing the one or more extension packages retrieved in accordance with the incoming configuration payload, and communicating a status report received by the VM agent component from the installed one or more extension packages to the VM deployment service component.

In a third embodiment described herein, a computer-implemented method for remotely customizing a virtual machine is provided. The method includes querying a remote VM agent component provided on a remote virtual machine to provide a configuration payload to a local virtual machine. The configuration payload includes references to one or more extension packages installed on the remote virtual machine and further available for download from an extension repository configured to store at least the one or more extension packages. The method further includes employing a local VM agent component on the local virtual machine to retrieve the one or more extension packages, in accordance with the configuration payload, from the extension repository to the local virtual machine. The method also includes installing, on the local virtual machine, the one or more extension packages retrieved in accordance with the configuration payload to replicate the one or more extension packages installed on the remote virtual machine.

Referring now to FIG. 1, FIG. 1 illustrates an exemplary cloud computing environment 100 in which implementations of the present disclosure may be employed. In particular, FIG. 1 shows a high level architecture of the system for remotely customizing virtual machines comprising a cloud computing platform 110. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the cloud computing environment 100 can include a cloud computing platform 110 having a VM marketplace component 120, a VM deployment service component 130, and at least one node 140 (e.g., computing devices, processing units, or blades). The cloud computing platform 110 runs cloud services across different data centers and geographic regions. The cloud computing platform 110 is accessible over a network 150 (i.e., the Internet) by, among other things, one or more client devices 160. The VM marketplace component 120 can be implemented as a cloud service apart from or as part of the cloud computing platform 110. The VM deployment service component 130 can also be implemented as a cloud service apart from or as part of the cloud computing platform 110. The cloud computing environment 100, or clouds with which the VM marketplace component 120 and/or VM deployment service component 130 are associated may be public clouds, private clouds, or dedicated clouds.

The VM marketplace component 120 can be a service (e.g., a web service) providing a catalog of applications (also referred to herein as "extension packages") designed around a common extension protocol, each application available for download and installation to a virtual machine configured to host a VM agent component, as will be described. In essence, the VM marketplace component 120 can provide an online marketplace or "app store" that provides VM administrators with a catalog of applications, each following specifications defined by a common extension protocol, which can be remotely injected into any particular virtual machine under the VM administrator's administrative authority. In some instances, it is contemplated that the VM marketplace component 120 can be configured to deny the cataloging of extension packages that do not follow the common extension protocol in order to ensure compatibility and consistency of extension package management during remote injection.

Remote injection of extension packages to a virtual machine is a feature that is based on the common extension protocol. More particularly, remote injection of extension packages is facilitated by way of the VM agent component being configured to seamlessly accept, install, configure, uninstall, and/or communicate with an extension package complying with the common extension protocol. In ideal configurations, specifications for complying with the common extension protocol can be provided to extension package developers or publishers so that extension packages developed for publication to the VM marketplace 120, and eventual management by the VM agent component, as will be described, may abide by the specifications defined by the common extension protocol. The common extension protocol can facilitate uniformity and consistency among extension packages published in the VM marketplace 120, and can further facilitate consistency in remote access and remote customization of virtual machines by ensuring that the VM agent component can handle the extension package according to specifications defined by the common extension protocol. In some instances, the common extension protocol can define how an extension package is installed, how it is uninstalled, how and when it should report statuses to the VM agent component, how and when it should communicate to other system components (i.e., the VM deployment service component 130) over the network, among other things.

The VM marketplace component 120, although illustrated as an abstract component, can be implemented in a node (i.e., a VM configured therein), a physical machine (e.g., a server), a separate cloud computing platform, or the like. The VM marketplace component 120 can catalog a plurality of extension packages, store and provide details associated with each extension package, reference storage locations (e.g., URIs to storage repositories) for downloading the extension packages, and facilitate selection and deployment of extension packages to virtual machines associated with an administrator.

The VM deployment service component 130 can be a service (e.g., a web service) providing an administrative control interface to virtual machine administrators. In essence, the VM deployment service component 130 can be associated to one or more administrators, and can communicate with both the VM marketplace component 120 and the administrator's virtual machines having a VM agent component configured thereon, as will be described. The VM deployment service component 130 interfaces with the administrator by receiving communications from, and providing information for display to, the administrator. The VM deployment service component 130, although illustrated as an abstract component, can be implemented in a node (i.e., a VM configured therein), a physical machine (e.g., a server), a separate cloud computing platform, or the like. The administrator can access the VM deployment service component 130 through the Internet 150 and administer installations of extension packages to various virtual machines. In more detail, by selecting from the VM marketplace component 120 any number of extensions packages to be injected to the virtual machines, the administrator can communicate, from the VM deployment service component 130, a configuration payload referencing the selected one or more extension packages to the virtual machine(s).

The node 140 can be provisioned with a host 170 (e.g., operating system or runtime environment) running a defined software stack on the node 140. Node 140 can also be configured to perform specialized functionality (e.g., compute nodes or storage nodes) within the cloud computing platform 110. The node 140 is allocated to run one or more portions of a service application of a tenant. A tenant can refer to a customer utilizing resources of the cloud computing platform 110. Service application components of the cloud computing platform 110 that support a particular tenant can be referred to as a tenant infrastructure or tenancy. The terms "service application," "application," or "service" are used interchangeably herein and broadly refer to any software, or portions of software, that run on top of, or access storage and compute device locations within, a datacenter.

When more than one separate service application is being supported by the nodes 140, the nodes may be partitioned into one or more virtual machines (e.g., virtual machine 180 and virtual machine 190). Physical machines can also concurrently run separate service applications. The virtual machines or physical machines can be configured as individualized computing environments that are supported by resources (e.g., hardware and software) (not shown) in the cloud computing platform 110. It is contemplated that resources can be configured for specific service applications. Further, each service application may be divided into functional portions such that each functional portion is able to run on a separate virtual machine. In the cloud computing platform 110, multiple servers may be used to run service applications and perform data storage operations in a cluster. In particular, the servers may perform data operations independently but exposed as a single devices referred to as a cluster. Each server in the cluster can be implemented as a node.

The virtual machines 180,190 can each include VM agent components 185, 195, respectively. The VM agent component resides on the virtual machine and can run as a service or daemon (i.e., an application continuously running in the background). The VM agent is typically installed on the virtual machine as an initial matter and associated with a VM deployment service component 130, both being associated with a common administrator. Association with an administrator can be facilitated by a user account, unique identifier, or other means of identifying ownership or administrative access. While the VM agent 185,195 is running as a service on a virtual machine 180,190, the VM agent 185,195 maintains a continuous connection to its associated VM deployment service component 130 so that connectivity therewith does not become interrupted by, for instance, a firewall or other occupied port. Because the VM agent 185,195 is responsible for maintaining the connection outside of the virtual machine 185,195, the concerns typically associated with connecting to a virtual machine from outside of a firewall or occupied port are no longer at issue. If network traffic is blocked, the VM agent 185,195 can seek an available port to establish connectivity to the VM deployment service component 130 and maintain that connection to receive any incoming communications (e.g., injections of extension packages), as will be described in more detail herein.

Client device 160 may be linked to a service application in the cloud computing platform 110. The client device 160 may be any type of computing device, which may correspond to computing device 500 described with reference to FIG. 5, for example. The client device 160 can be configured to issue commands to cloud computing platform 110. In embodiments, client device 160 may communicate with service applications through a virtual IP and load balancer or other means that directs communication requests to designated endpoints in the cloud computing platform 110. The components of cloud computing platform 110 may communicate with each other over a network (not shown), which may include, without limitations, one or more local area networks (LANs) and/or wide area networks (WANs).

Having described various aspects of the cloud computing environment 100 and cloud computing platform 110, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Figure 2:
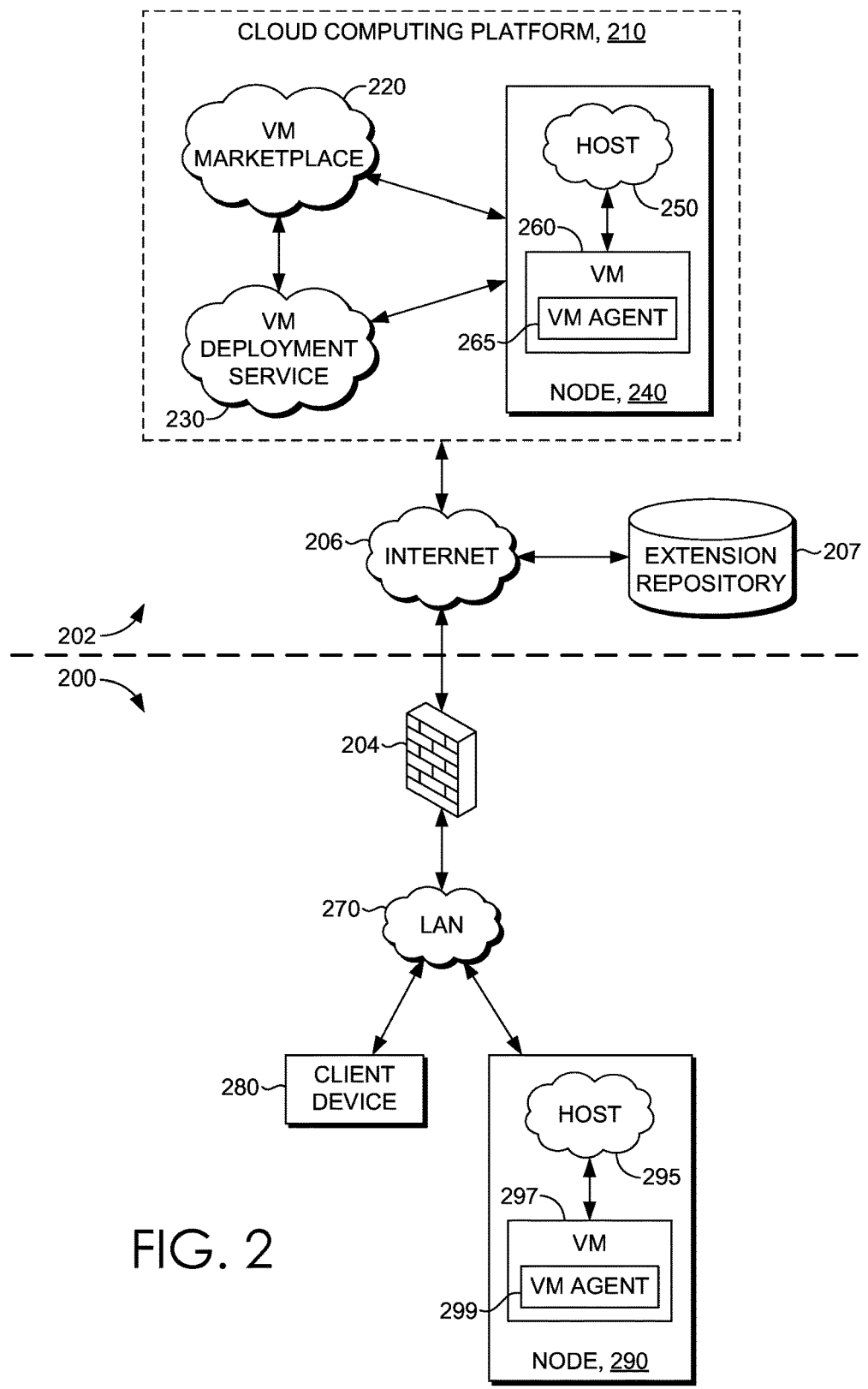
FIG. 2 is a schematic of an exemplary extension framework for remotely customizing a virtual machine, in accordance with embodiments described herein.

With reference to FIG. 2, FIG. 2 illustrates an exemplary cloud-based extension framework, in accordance with an aspect of the present invention. As described with respect to FIG. 1, a cloud computing environment 200 is illustrated in conjunction with a local area computing environment 202. A firewall 204 provided with the local area computing environment 202 can restrict the flow of traffic between the Internet 206 and the local area computing environment 202 by blocking any number of ports through which network traffic may flow, as one of skill in the art may appreciate. Thought not illustrated, any component illustrated in FIGS. 1 and 2 can have a firewall associated therewith. As was described with respect to FIG. 1, the cloud computing environment 200 includes a cloud computing platform 210 that can comprise a VM marketplace component 220, a VM deployment service component 230, and at least one node 240.

As was described, the at least one node 240 can be provisioned with a host 250 (e.g., operating system or runtime environment) running a defined software stack on the node 240. Node 240 can also be configured to perform specialized functionality (e.g., compute nodes or storage nodes) within the cloud computing platform 210. The node 240 is allocated to run one or more portions of a service application of a tenant. A tenant can refer to a customer utilizing resources of the cloud computing platform 210. Service application components of the cloud computing platform 210 that support a particular tenant can be referred to as a tenant infrastructure or tenancy. The terms "service application," "application," or "service" are used interchangeably herein and broadly refer to any software, or portions of software, that run on top of, or access storage and compute device locations within, a datacenter.

When more than one separate service application is being supported by the nodes 240, the nodes may be partitioned into one or more virtual machines (e.g., virtual machine 260). Physical machines can also concurrently run separate service applications. The virtual machines or physical machines can be configured as individualized computing environments that are supported by resources (e.g., hardware and software) (not shown) in the cloud computing platform 210. It is contemplated that resources can be configured for specific service applications. Further, each service application may be divided into functional portions such that each functional portion is able to run on a separate virtual machine. In the cloud computing platform 210, multiple servers may be used to run service applications and perform data storage operations in a cluster. In particular, the servers may perform data operations independently but exposed as a single devices referred to as a cluster. Each server in the cluster can be implemented as a node.

The one or more virtual machines 260 can each include a VM agent component 265. The VM agent component resides on the virtual machine and can run as a service or daemon (i.e., an application continuously running in the background). The VM agent component 265 is typically installed on the virtual machine as an initial matter and associated with a VM deployment service component 230, both being associated with a common administrator. Association with an administrator can be facilitated by employing a user account, unique identifier, or other means for identifying unique ownership or administrative access, as can be appreciated. While the VM agent component 265 is running as a service on a virtual machine 260, the VM agent component 265 maintains a continuous connection to its associated VM deployment service component 230 so that connectivity therewith does not become interrupted by, for instance, a firewall or other occupied port.

The remote injection of extension packages, as briefly described above, is facilitated by maintaining a consistent connection between the VM agent component 265 and VM deployment service component 230, as will be described. Because the VM agent component 265 is responsible for maintaining the connection external to the virtual machine 260, concerns typically associated with connecting to a virtual machine from outside of a firewall or occupied port is not at issue. In some instances, if the VM agent component 265 establishes a connection external to the firewall, from within the virtual machine, the traffic flowing from that connection will not be interrupted by the firewall. In some other instances, if network traffic is blocked, the VM agent 265 can seek an available port to establish connectivity to the VM deployment service component 230 and maintain that connection to receive any incoming communications (e.g., injections of extension packages for installation). To this end, remote injection of extension packages to a virtual machine is a feature facilitated not only by the fact that the extension packages must comply with the common extension protocol for compatibility with the VM agent component 265, but also due to the fact that the network connection between the VM agent component 265 and VM deployment service component 230 is consistently available, as described, for facilitating communication there between.

The local area computing environment 202 behind firewall 204 can include a local area network connection 270, one or more client computing devices 280, and one or more nodes 290. Although the local area computing environment 202 is illustrated herein having the computing device 280 and node 290, it is contemplated that these components can be managed in various configurations apart from the local area computing environment 202 through Internet connection 206. The node 290 can be configured the same as node 240 or node 140 of FIG. 1. As described, the node 290 can be provisioned with a host 295, which can be partitioned into one or more virtual machines 297, which can include a VM agent component 299. The node 290, which is configured on the local area network environment 202, can be configured to provide a service application and function similarly to cloud computing platform 210. The node 290 is configured in the local area network 202, such that communications are preserved internal to the local area network environment 202 and devoid of traditional security concerns related to communications over Internet 206.

The client device 280 can be any computing device in communication to the local area network 270 and/or Internet 206. The client device 280 is configured to communicate with VM deployment service 230 and further to provide an administrator customization controls of one or more nodes associated with the administrator's account. As described, the VM deployment service 230 can be in communication with one or more VM agents 265, 299 configured to associate with the administrator. The configuration illustrated in FIG. 2 can provide for remote customization of a virtual machine on a local network by initiating a provisioning sequence on the VM agent 299. The local VM agent component 299 can be configured to query, over a network, a remote VM agent component 265 to provide the local VM agent component 299 with a configuration payload including references to one or more of the extension packages installed on the remote virtual machine 260. The configuration payload can reference storage locations for downloading the one or more extension packages. The references can be in the form a network location (e.g., a uniform resource identifier or URI) for downloading files from an extension repository 207. The extension repository 207 can comprise one or more storage devices for maintaining a plurality of extension packages cataloged by the VM marketplace 220.

One or more VM agent components external or internal to a local area network environment 200 can be configured to query another VM agent component associated with an administrator and in communication with VM deployment service 230 (for instance, over the Internet 206). The query can be direct or indirect (i.e., through the VM deployment service 230). Upon receiving a configuration payload, a VM agent component 265,299 can be configured to retrieve the one or more extension packages provided in the configuration payload from the extension repository. Once retrieved, the VM agent component can be configured to install the one or more extension packages to the virtual machine on which the VM agent component resides. To this end, any virtual machine (local or remote) associated with the illustrated extension framework provided herein can be provisioned to replicate any other virtual machine (local or remote). Such a configuration provides for simplified provisioning of one or more locally configured virtual machines when migrating one or more virtual machines from a remote cloud computing environment to a local computing environment.

Figure 3:
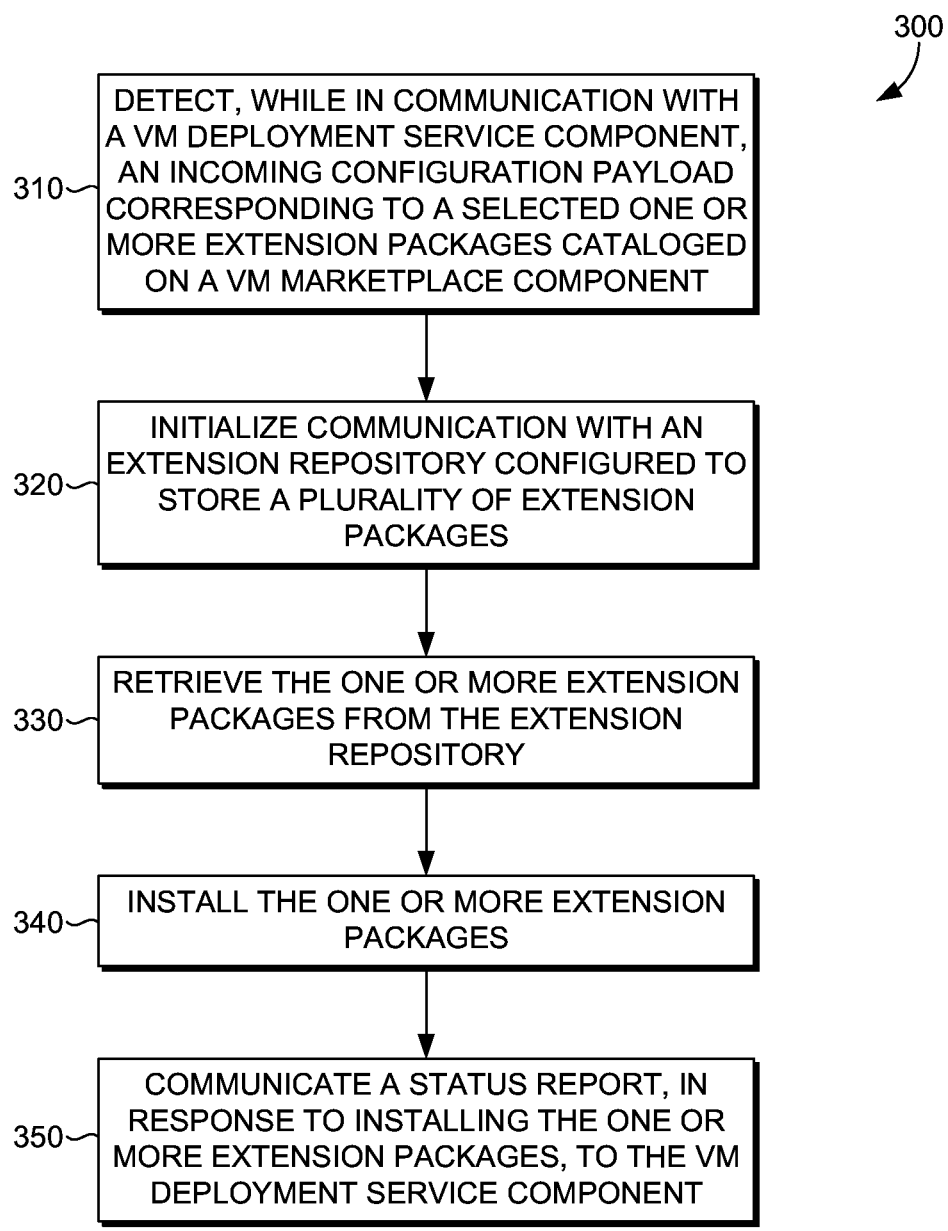
FIG. 3 is a flow diagram showing an exemplary method for remotely customizing a virtual machine, in accordance with embodiments described herein.

Turning now to FIG. 3, a flow diagram is provided that illustrates a method for remotely customizing virtual machines. Initially, at block 310, an incoming configuration payload is detected by a VM agent component provided on a virtual machine. The incoming configuration payload is detected by the VM agent component while in communication with a VM deployment service component associated with the virtual machine. The VM deployment service component can be associated with the virtual machine by a user account, unique identifier, or some other access controlling mechanism. The incoming configuration payload can correspond to a selected one or more extension packages cataloged on a VM marketplace component that is in communication with the VM deployment service component. At block 320, communication between the VM agent component and an extension repository configured to store a plurality of extension packages is initialized. In accordance with the incoming configuration payload, at block 330, the one or more extension packages are retrieved from the extension repository to the virtual machine based on the maintained connection between the VM agent component and the VM deployment service component, facilitated by way of the VM agent component, thereby further enabling the "remote injection" of the extension components to the virtual machine. At block 340, the one or more extension packages are installed to the virtual machine. At block 350, a status report is received by the VM agent component from the extension packages configured to communicate a status report to the VM agent upon installation (i.e., a successful or failed installation message). The status report received by the VM agent component is communicated to the VM deployment service component for communication of the status report to the administrator.

Figure 4:
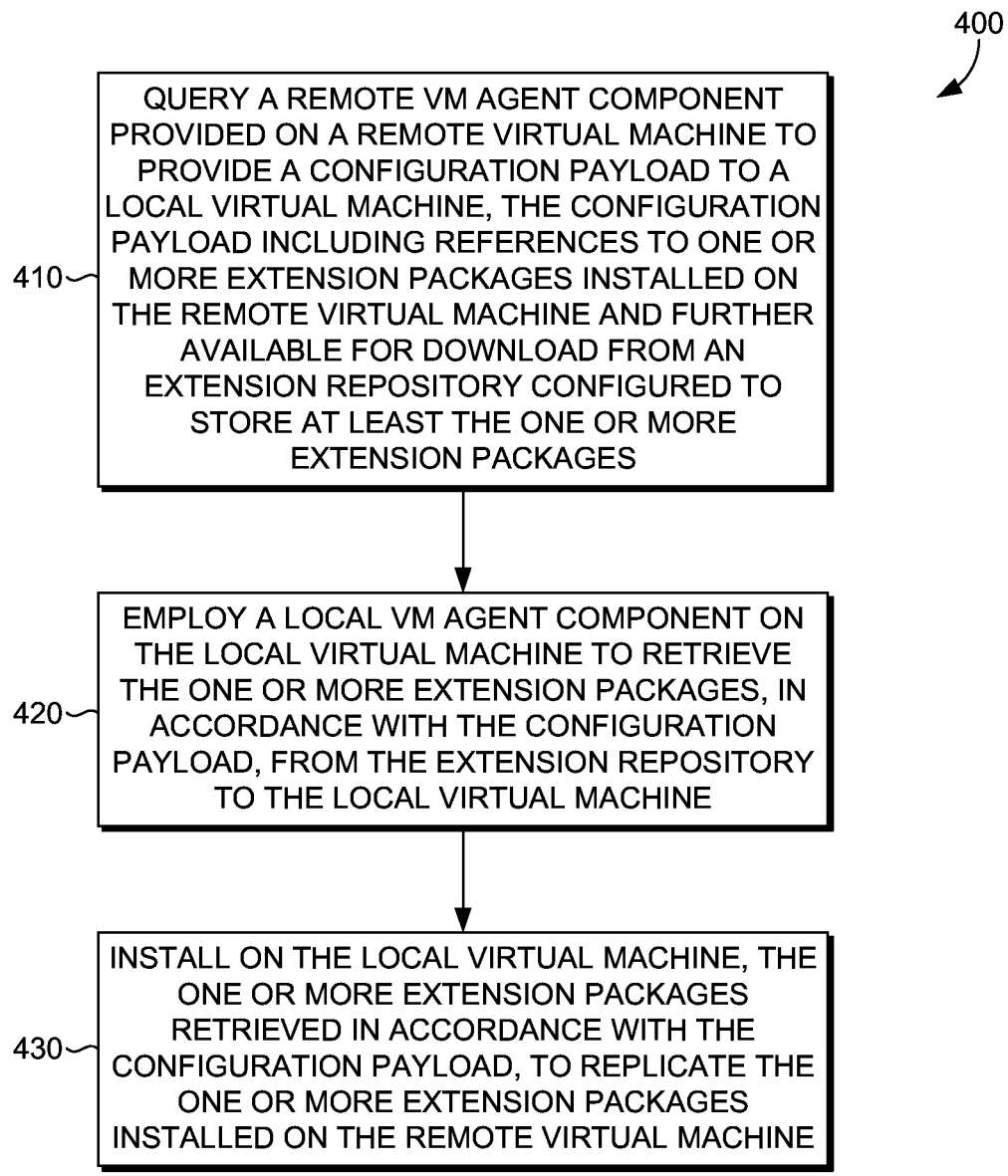
FIG. 4 is a flow diagram showing an exemplary method for remotely customizing a virtual machine, in accordance with embodiments described herein.

Turning now to FIG. 4, a flow diagram is provided that illustrates a method for remotely customizing virtual machines. Initially at block 410, a remote VM agent component provided on a remote virtual machine is queried to provide a configuration payload to a local virtual machine. The remote VM agent component is queried over the maintained connection between the remote VM agent component and the VM deployment service component, facilitated by way of the remote VM agent component, as described herein. The configuration payload includes references to one or more extension packages installed on the remote virtual machine. The references provide storage locations (i.e., URIs) associated with an extension repository for downloading the one or more extension packages. At block 420, a local VM agent component on the local virtual machine retrieves the one or more extension packages in accordance with the configuration payload and also based on the maintained connection between the local VM agent component and the VM deployment service component, facilitated by way of the local VM agent component, thereby further enabling the "remote injection" of the extension components to the local virtual machine. At block 430, upon downloading the one or more extension packages from the extension repository, the local VM agent initiates an install of the one or more extension packages to replicate the one or more extension packages installed on the remote virtual machine.

Figure 5:
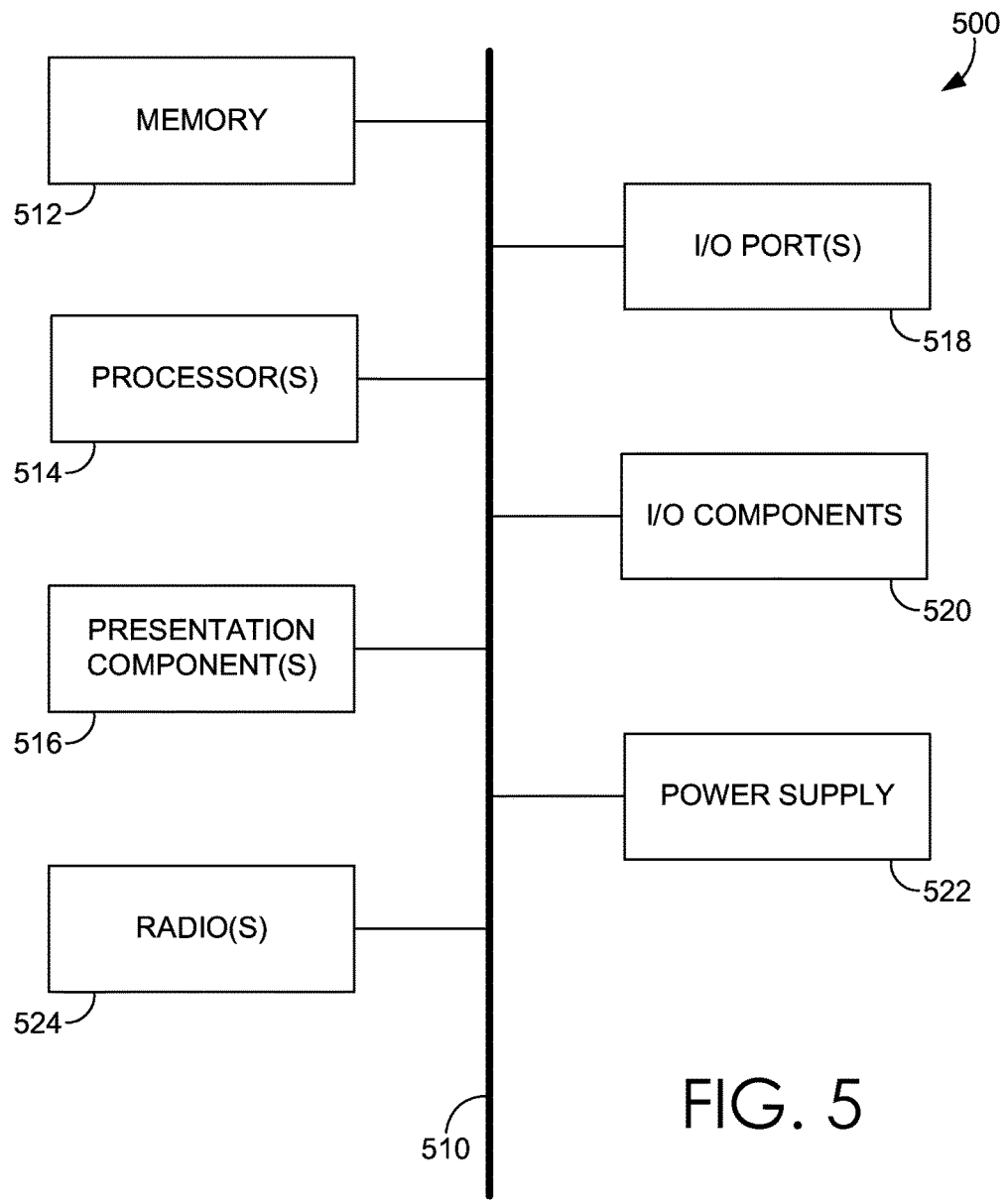
FIG. 5 is a block diagram of an exemplary computing environment suitable for use in implementing embodiments described herein.

Having briefly described an overview of embodiments of the present invention, an exemplary operating environment in which embodiments described herein may be implemented is described below in order to provide a general context for various aspects of the present invention. Referring initially to FIG. 5 in particular, an exemplary operating environment for implementing embodiments described herein is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device,"

etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A remote virtual machine (VM) customization system comprising; a VM marketplace component configured to:
   catalogue a plurality of extension packages that each employ a common extension protocol, and
   generate a configuration payload that corresponds to a set of extension packages selected, via a remote client device, from the catalogued plurality of extension packages,
   wherein the generated configuration payload references the selected set of extension packages and a remote extension repository having the selected set of extension packages stored thereon; and a VM agent component, installed on a virtual machine and running as a daemon, configured to:
   identify, from behind a firewall of the virtual machine, an available port;
   establish, based upon the identified available port, a network connection to a VM deployment service component that is external to the firewall and remote from the VM marketplace component and the remote client device,
   facilitate, via the established network connection, an injection of the selected set of extension packages of the catalogued plurality of extension packages, and
   receive, from behind the firewall of the virtual machine and through the established network connection with the VM deployment service component, the injection of the selected set of extension packages of the catalogued plurality of extension packages based on the selection received by the VM marketplace component and further based on the common extension protocol being employed by the VM agent component
   initialize, in accordance with the common extension protocol, an installation of the selected set of extension packages based on the receipt thereof from the remote extension repository;
   and
   generate, in accordance with the common extension protocol, a status report corresponding to the installation of the selected set of extension packages.

2. The system of claim 1, wherein each extension package in the plurality of catalogued extension packages is one of a plurality of installable applications configured for operation on at least a portion of the virtual machine.

3. The system of claim 1, wherein the VM marketplace component is further configured to receive one or more custom extension packages to catalogue with the plurality of extension packages.

4. The system of claim 3, wherein the the one or more custom extension packages employ the common extension protocol.

5. The system of claim 1, wherein the VM agent component is further configured to run as a background service on the virtual machine.

6. The system of claim 1, wherein the VM deployment service component is further configured to reference each extension package installed on the virtual machine to generate a cloned configuration payload for communication to a remote computing device, wherein the cloned configuration payload communicated to the remote computing device is employable to clone the virtual machine thereon.

7. One or more computer storage media having computer-executable instructions embodied thereon that, when executed by one or more processors, causes the one or more processors to:
   Identify, by a VM agent component installed on a virtual machine and running as a daemon, an open port of a firewall to establish there through a continuous network connection to a remote server device;

select at least one extension package from a plurality of extension packages included in a virtual machine marketplace catalogue provided by the remote server device via the established continuous network connection based upon the identified port, a, wherein each extension package in the plurality of extension packages employ a common extension protocol;

receive via the established continuous network connection, in accordance with the common extension protocol, a configuration payload generated by the remote server device based on the selected at least one extension package;

receive, in accordance with the common extension protocol, the selected at least one extension package from an extension repository that is separate from the remote server device, wherein a connection to the extension repository is established based on the received configuration payload;

initialize, in accordance with the common extension protocol, an installation of the :elected at least one extension package based on the receipt thereof from the extension repository; and generate, in accordance with the common extension protocol, a status report for communication to the remote server device, the status report corresponding to the installation of the selected at least one extension package.

8. The media of claim 7, wherein the remote server device is configured to communicate the generated status report to a remote client device associated with the administrator account.

9. A computer-implemented method for remote virtual machine customization, the method comprising:

querying, by a first host device, a second host device;

receiving, based on the query, a configuration payload that references one or more extension packages currently installed on a virtual machine of the second host device and a remote extension repository having the one or more extension packages stored thereon, wherein each extension package in the one or more extension packages employ a common extension protocol;

establishing, by a VM agent component installed on and running as a daemon on the first host device, a network connection to an extension repository that is separate from the first and second host devices, the network connection being established to download the referenced one or more extension packages in accordance with the common extension protocol and based upon an available port identified from behind a firewall of the first host device;

installing, by the first host device and to a different virtual machine thereof, the downloaded one or more extension packages to replicate the one or more extension packages currently installed on the virtual machine of the second host device, wherein the installation of the downloaded one or more extension packages is performed in accordance with the common extension protocol and generate, in accordance with the common extension protocol, a status report corresponding to the installation of the downloaded one or more extension packages.

10. The method of claim 9, wherein the first host device is separate from the second host device by way of a firewall.

11. The method of claim 9, wherein the querying, establishing, and installing steps are performed based further in part on the first and second host devices both being associated with an administrator account.

12. The method of claim 9, wherein the common extension protocol includes a virtual machine deployment framework to facilitate proper installation, configuration delivery, and status report retrieval of at least one extension package.

* * * * *